US008281883B2

(12) United States Patent
Prinz et al.

(10) Patent No.: US 8,281,883 B2
(45) Date of Patent: Oct. 9, 2012

(54) METHOD AND APPARATUS FOR TRANSPORTING CONSTRUCTION EQUIPMENT IN AN ENCLOSED CONTAINER WITHIN THE HOLD OF A VESSEL

(76) Inventors: Adalberto Prinz, Miami, FL (US);
Hugo M. Ledezma, Miami, FL (US);
Alejandro A. Prinz, Miami, FL (US)

(*) Notice: Subject to any disclaimer, the term of this patent is extended or adjusted under 35 U.S.C. 154(b) by 252 days.

(21) Appl. No.: 12/268,463

(22) Filed: Nov. 11, 2008

(65) Prior Publication Data
US 2010/0119339 A1 May 13, 2010

(51) Int. Cl.
*E02F 9/02* (2006.01)
*B65D 85/68* (2006.01)
*B60B 3/00* (2006.01)

(52) U.S. Cl. ............... 180/7.1; 180/209; 410/4; 206/335

(58) Field of Classification Search ............ 301/64.201, 301/64.301, 64.304, 64.305, 64.302, 64.303, 301/35.621, 35.625, 35.626, 35.627; 180/209, 180/7.1; 152/152, 246; 254/418, 422, 423; 410/3, 4; 53/428, 473; 206/335
See application file for complete search history.

(56) References Cited

U.S. PATENT DOCUMENTS

| | | | |
|---|---|---|---|
| 1,290,818 A | 1/1919 | Duncan | |
| 1,379,352 A * | 5/1921 | Lougheed | 301/64.302 |
| 1,379,773 A | 5/1921 | Miller | |
| 1,387,632 A * | 8/1921 | Watson et al. | 301/64.303 |
| 1,424,818 A * | 8/1922 | Guernsey | 301/64.302 |
| 1,492,706 A * | 5/1924 | Ferrabino | 301/64.304 |
| 1,562,003 A * | 11/1925 | Schenck et al. | 301/64.201 |
| 1,566,017 A | 12/1925 | Jones | |
| 2,187,777 A * | 1/1940 | Gannett | 301/64.304 |
| 2,195,589 A * | 4/1940 | Eksergian | 301/36.1 |
| 2,336,767 A * | 12/1943 | Ash | 301/35.625 |
| 2,339,859 A * | 1/1944 | Hunt et al. | 301/64.201 |
| 3,554,535 A * | 1/1971 | Gerry | 301/64.304 |
| 3,565,490 A | 2/1971 | Statz | |
| 4,549,592 A | 10/1985 | Schroder | |
| 4,570,417 A | 2/1986 | Herr | |
| 4,944,563 A | 7/1990 | Pinchbeck et al. | |
| 5,026,246 A * | 6/1991 | Bay et al. | 414/694 |
| 5,251,965 A | 10/1993 | Johnson | |
| 6,375,243 B1 | 4/2002 | Bradley et al. | |

FOREIGN PATENT DOCUMENTS

DE 1275899 B 8/1968

\* cited by examiner

*Primary Examiner* — Paul N Dickson
*Assistant Examiner* — Wesley Potter
(74) *Attorney, Agent, or Firm* — GrayRobinson, P.A.

(57) ABSTRACT

A method and apparatus for permitting construction equipment, and particularly backhoe loaders, to be transported in the hold of a seagoing vessel within the interior of an enclosed cargo container includes front and rear rollers that temporarily replace the wheels of the equipment and allow it to be driven into and out of the container without any disassembly of the equipment.

3 Claims, 5 Drawing Sheets

US 8,281,883 B2

METHOD AND APPARATUS FOR TRANSPORTING CONSTRUCTION EQUIPMENT IN AN ENCLOSED CONTAINER WITHIN THE HOLD OF A VESSEL

FIELD OF THE INVENTION

This invention relates to the transport of construction equipment, and, more particularly, to a method and apparatus for permitting construction equipment to be driven into and out of enclosed cargo containers for transport in the hold of seagoing vessels.

BACKGROUND OF THE INVENTION

The most common way of transporting construction equipment from the manufacturer to customers located in countries on other continents is by seagoing vessel. Typically, backhoe loaders and similar pieces of equipment are driven into the vessel hold and arranged as close together as practicable so as not to cause damage during loading, unloading or transport. In some instances, open top containers are employed which receive one or more pieces of equipment and are then loaded into the hold of the vessel.

Charges for the transport of items by vessel are based on weight, or on the volume of the hold of the vessel that such items occupy. The hold volume is determined by the surface area of the floor of the hold and its overall height. The problem with shipping backhoe loaders and similar pieces of equipment is that while they may be arranged in close proximity to one another along the floor of the vessel hold, all of the volume of the hold above them is wasted space. Since vessel owners usually charge according to what generates the most revenue, manufacturers of construction equipment normally must pay according to the total volume of the hold located above their equipment even though it occupies space along only the floor area.

Enclosed cargo containers have been employed for some time as a means of efficiently utilizing the total volume within the holds of vessels. Containers of this type may be stacked on top of one another and therefore fill much more of the total volume of the hold compared to items which cannot be stacked, such as construction equipment. While it would be advantageous to transport construction equipment within enclosed cargo containers, their dimensions are such that under current practices backhoe loaders and similar equipment do not fit therein without disassembly of at least a part of such equipment.

SUMMARY OF THE INVENTION

This invention is directed to a method and apparatus for permitting construction equipment, and particularly backhoe loaders, to be transported in the hold of a seagoing vessel within the interior of an enclosed cargo container.

In the presently preferred embodiment, a pair of front rollers and a pair of rear rollers are each formed from a first plate and a second plate that are welded together. Each plate has a flange which extends outwardly such that the flange of one plate opposes the flange of the other. A circumferentially extending outer ring is mounted to the flanges of the two plates, and a recess is formed in the outer ring within which an insert is secured.

The front rollers and rear rollers are sized to temporarily take the place of the respective front and rear wheels of the backhoe loader such that its overall height dimension is reduced enough to allow it to be driven into and out of the interior of an enclosed cargo container. As discussed in detail below, the method of this invention allows a single worker to perform the loading and unloading operation without special tools and in an efficient manner.

Use of enclosed cargo containers to ship backhoe loaders and similar equipment via seagoing vessels can result in a dramatic decrease in shipping costs. Because enclosed cargo containers can be stacked one on top of the other, much more of the volume of the vessel hold can be utilized with the method and apparatus of this invention compared to current practices, where, as discussed above, the equipment is merely driven into the vessel hold and all the space above the floor area is wasted.

BRIEF DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE INVENTION

Figure 1:
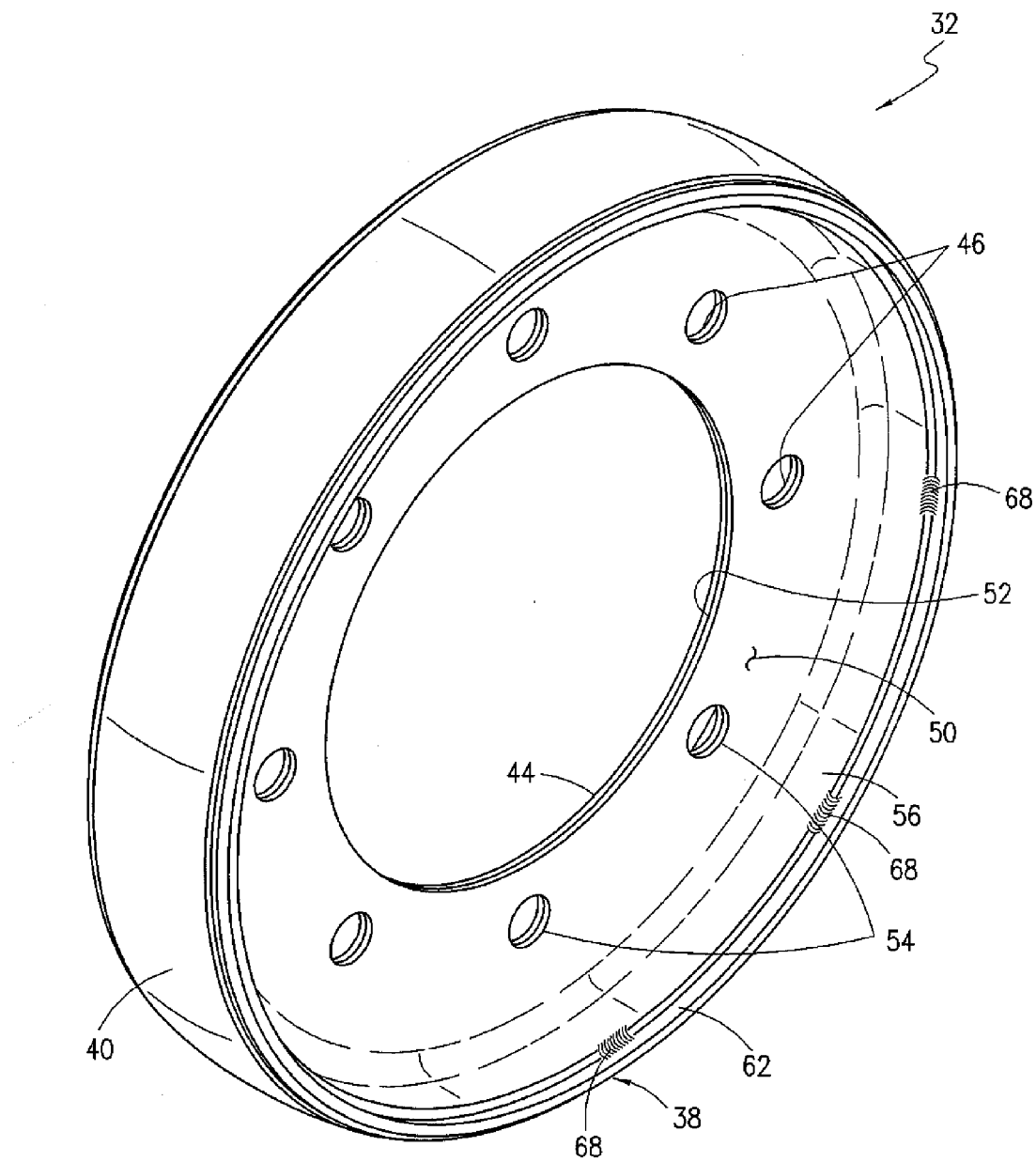
FIG. 1 is perspective view of a roller of this invention.

Referring now to the FIGS., the method and apparatus of this invention is illustrated with particular reference to a backhoe loader 10 which comprises a tractor 11 a front loader 12 mounted to the front of the tractor 11 and a rear backhoe 14 mounted to the rear of the tractor 11. The tractor 11 of the backhoe loader 10 further includes a cab 16, a frame 18, rear stabilizer arms 20 mounted on opposite sides of the frame 18, front wheels 22 and rear wheels 24.

Figure 2:
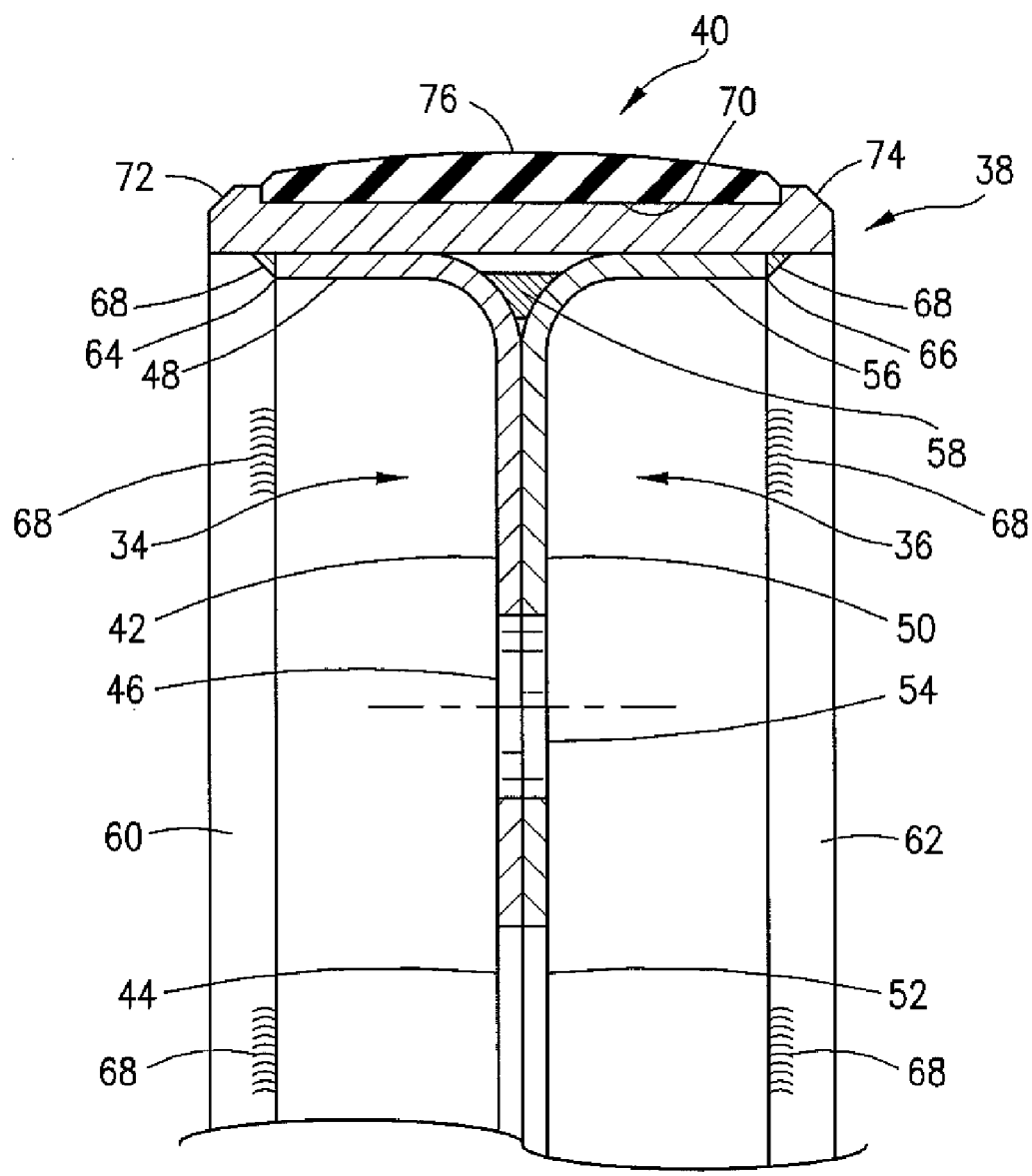
FIG. 2 is a cross sectional view of a portion of the roller shown in FIG. 1.
Figure 3:
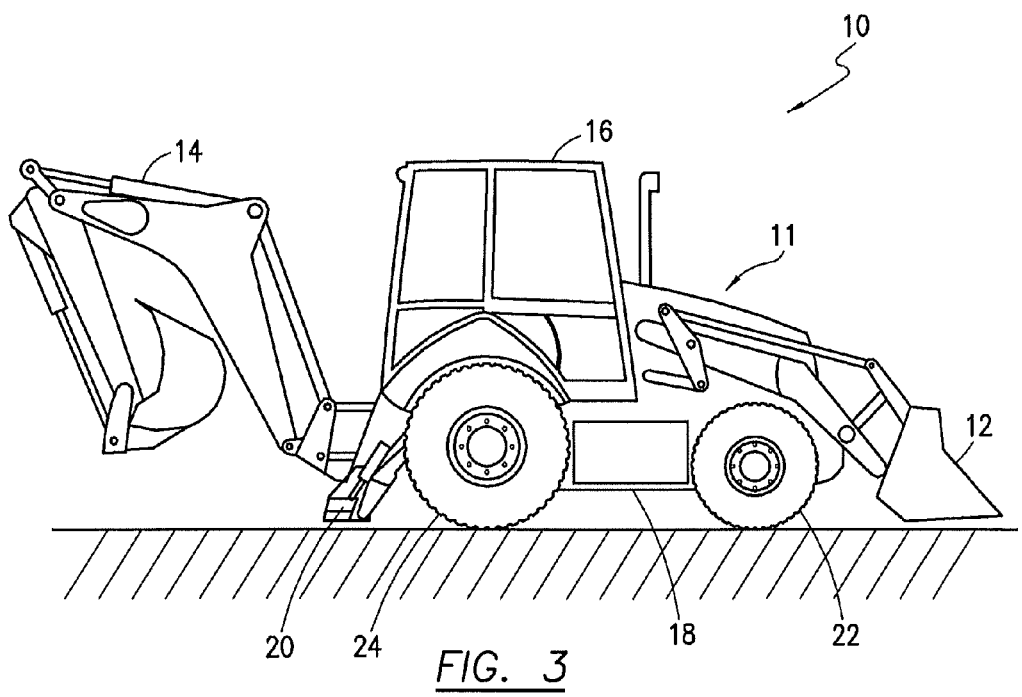
FIG. 3 is a side view of a backhoe loader.
Figure 5:
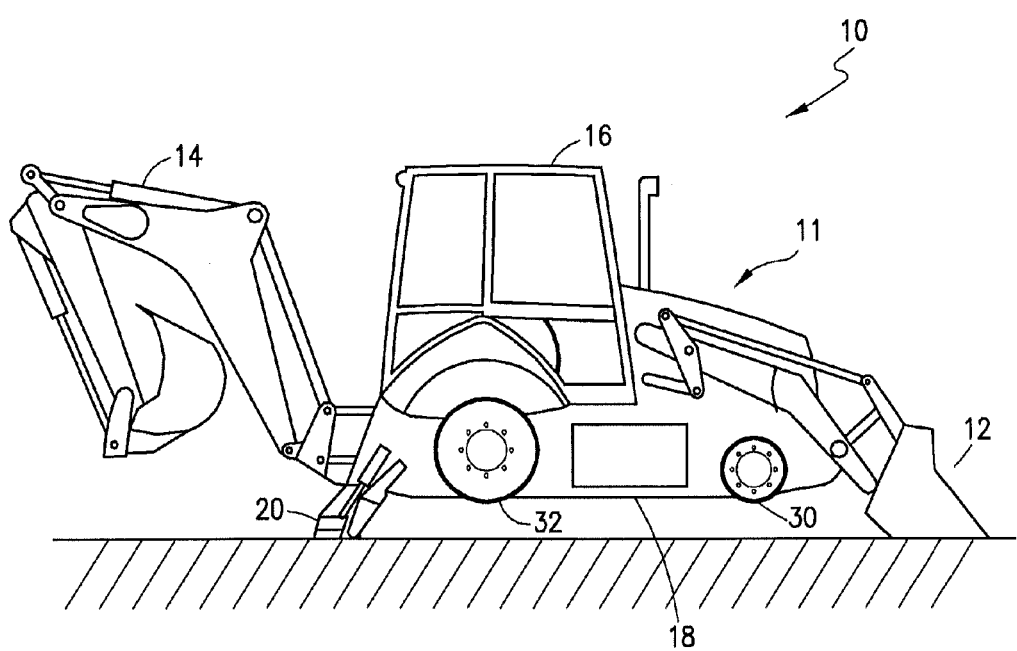
FIG. 5 is a view similar to FIG. 4 showing the front and rear wheels removed and replaced by the rollers of this invention.
Figure 6:
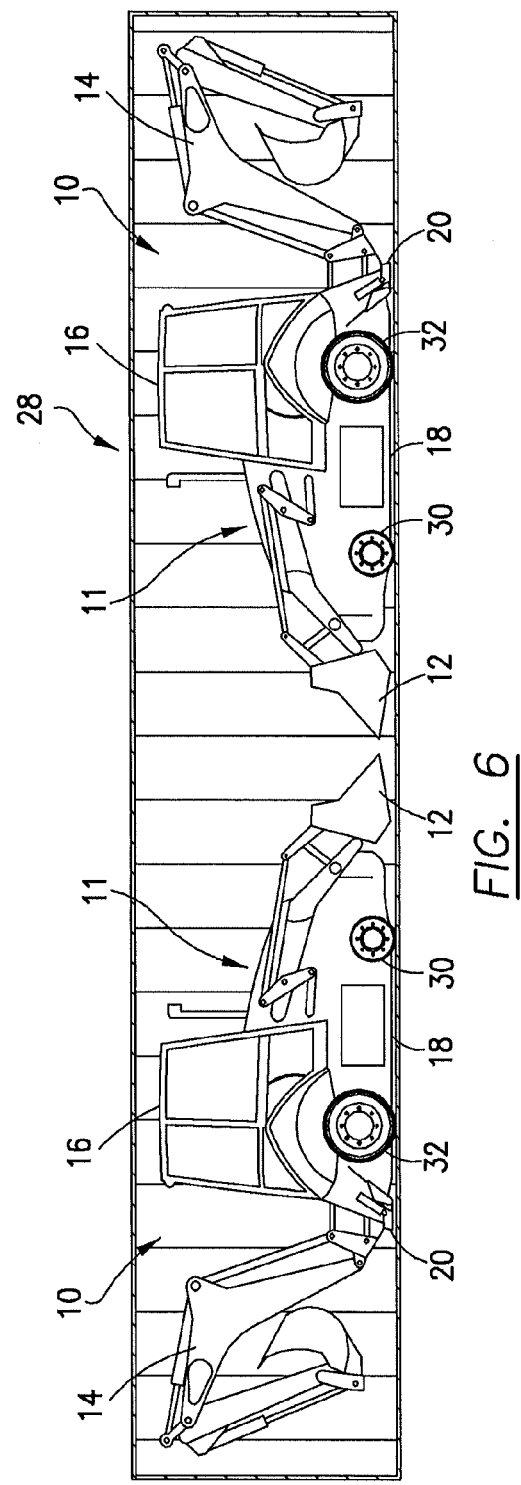
FIG. 6 is a view of backhoe loaders with the rollers mounted thereon driven into the interior of an enclosed cargo container.

As best seen in FIGS. 1, 2 and 5, the apparatus of this invention comprises two front rollers 30 and two rear rollers 32, only one of each of which is shown in the FIGS. Each roller 30 and 32 has the same construction, except for its diameter, and therefore only the details of rear rollers 32 are described herein it being understood that the following discussion applies equally to the front rollers 30. Each rear roller 32 comprises a first plate 34, a second plate 36, an outer ring 38 and an insert 40. The first and second plates 34, 36 are generally circular in shape, and are essentially mirror images of one another. The first plate 34 has a center section 42 formed with a central bore 44 and a number of wheel stud holes 46 that extend radially outwardly from, and are circumferentially spaced about, the central bore 44. The outer portion of the first plate 34 is bent to form a flange 48 that is oriented substantially perpendicularly to the center section 42 of the first plate 34. The second plate 36 has the same construction as first plate 34. It includes a center section 50 having a central bore 52, wheel stud holes 54 and a flange 56. The first and second plates 34, 36 are oriented relative to one another so that their center sections 42, 50 abut, the respective central bores 44, 52 and wheel stud holes 46, 54 align, and, the flanges 48, 56 are located opposite one another in substantially the same plane. In this position, the first and second plates 34, 36 are preferably welded to one another, such as by a series of circumferentially spaced welds 58, one of which is shown in FIG. 2.

The outer ring 38 rests against the flange 48 of the first plate 34 and against the flange 56 of the second plate 36. An portion 60 of the outer ring 38 extends radially outwardly from an outer edge 64 of the flange 48, and an outer portion 62 of the outer ring 38 extends radially outwardly from an outer edge 66 of the flange 56. The outer portions 60, 62 of outer ring 38 provide a surface for welding in order to connect the outer ring 38 to the flanges 48, 56, such as by welds 68, as illustrated in FIGS. 1 and 2. The outer ring 38 is also formed with a circumferential recess 70 within which the insert 40 is mounted. In the presently preferred embodiment, the edges 72 and 74 on opposite sides of the outer ring 38 are each formed with a taper. This allows a milling machine (not shown) to form a convex curvature on the exposed surface 76 of the insert 40 without interference from the outer ring 38. See FIG. 2.

The first and second plates 34, 36 and the outer ring 38 are preferably formed of hot rolled steel or other suitable material. The dimensions of these elements 34, 36 and 38 are chosen to provide a safety factor of 8 or more, considering the weight of currently commercially available backhoe loaders 10. The insert 40 is preferably a heavy-duty conveyor belt of the type used in mining operations, or similar belt-like constructions which exhibit limited compression under load.

Figure 4:
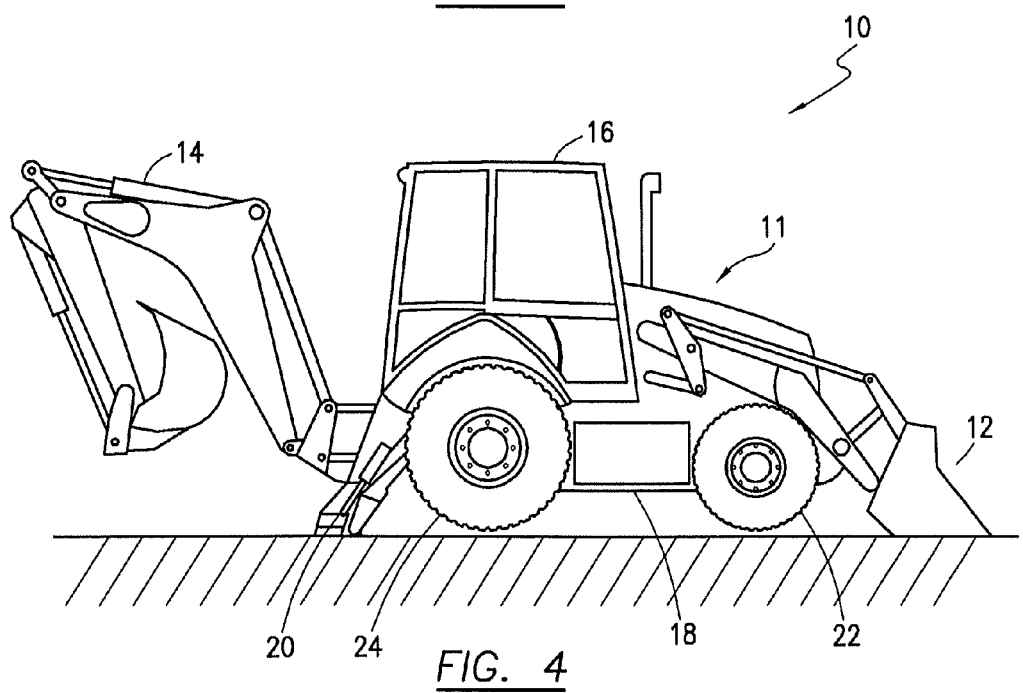
FIG. 4 is a view similar to FIG. 3, except with the loader and rear stabilizer arms of a backhoe loader in the extended position.

The method of this invention may be described with reference to FIGS. 3-6. The backhoe loader 10 is initially depicted in a position with the rear stabilizer arms 20 of the tractor 11 extended but off of the ground 76. See FIG. 3. The front loader 12 and stabilizer arms 20 are then both extended, as shown in FIG. 4, so that the frame 18, front wheels 22 and rear wheels 24 of the tractor 11 are lifted off of the ground. For purposes of the present discussion, the term "wheel" as used herein refers to both the wheels and tires of the tractor 11 of the backhoe loader 10. With the backhoe loader 10 in the position shown in FIG. 4, a worker may loosen the wheel lugs (not shown) holding the front and rear wheels 22, 24 of the tractor 11 on the wheel studs (not shown) and then remove all four wheels 22, 24.

Referring to FIG. 5, the front wheels 22 of the tractor 11 are replaced with two front rollers 30 of this invention, and the rear wheels 24 of the tractor 11 are replaced by two rear rollers 32. As noted above and seen in FIG. 5, the front rollers 30 have the same construction as the rear rollers, except a smaller diameter just as the front wheels 22 of the backhoe loader 10 are smaller than its rear wheels 24. After the front and rear rollers 30, 32 are in place, the loader 12 and stabilizer arms 20 may be retracted so that the weight of the backhoe loader 10 is now carried by such rollers 30, 32. The diameters of the rollers 30, 32 are chosen so that the overall height of the backhoe loader 10, e.g. the dimension from the lowermost portion of the frame 18 to the top of the cab 16 of the tractor 11 is less than the height of the enclosed cargo container 28. Consequently, the backhoe loader 10 may be driven into the enclosed cargo container 28 without interference from the top or bottom walls of the container 28. The insert 40 undergoes limited, if any, compression under the weight of the backhoe loader 10 to ensure that the frame 18 does not engage the ground or bottom wall of the enclosed container 28. Additionally, the convexly curved exposed surface 76 of the insert 40 resists tearing or other damage due to shear forces generated by turning of the rollers 30, 32 along the ground or bottom of the container 28 as the backhoe loader 10 is driven into and out of the container 28. If desired, the wheels 22, 24 of the tractor 11 of the backhoe loader 10 may be inserted into the container 28 in the areas between adjacent backhoe loaders 10 (not shown) to fill up that space and provide a convenient means of transporting the wheels 22, 24.

When the vessel carrying the cargo container 28 reaches its destination, the procedure described above is simply reversed. Each backhoe loader 10 may be driven out of the container 28, and the rollers 30, 32 replaced with wheels 22, 24 of the tractor 11 by raising and lowering the frame 18 as discussed above. The transport of backhoe loaders 10 and similar types of construction equipment by the method of this invention greatly reduces shipping costs by allowing stackable, enclosed cargo containers 28 to be employed which more efficiently use the total volume of the hold of shipping vessels than existing methods of transport.

While the invention has been described with reference to a preferred embodiment, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. The method of transporting a backhoe loader within an enclosed cargo container for shipment within the hold of a vessel, the backhoe loader including a tractor, a loader mounted to the front of the tractor, a backhoe mounted to the rear of the tractor and a stabilizer arm mounted on each side of the frame of the tractor, said method comprising:
    (a) engaging the ground with the stabilizer arms and the loader of the backhoe loader;
    (b) extending the stabilizer arms and the loader of the backhoe loader so as to lift the frame, the two front wheels and the two rear wheels of the tractor of the backhoe loader off of the ground;
    (c) removing the two front wheels and removing the two rear wheels of the tractor of the backhoe loader with its frame elevated from the ground;
    (d) providing two front rollers and two rear rollers;
    (e) mounting said two front rollers to the tractor of the backhoe loader each in place of one of the two front wheels of the tractor, and mounting the two rear rollers to the tractor of the backhoe loader each in place of one of the two rear wheels of the tractor, so that the height of the backhoe loader is less than the height of the enclosed cargo container;
    (f) retracting the stabilizer arms and the loader so that the two front rollers and the two rear rollers contact the ground;
    (g) driving the tractor of the backhoe loader on the two front rollers and on the two rear rollers into the interior of an enclosed cargo container for shipment within the hold of a vessel.

2. The method of claim 1 further including:
    (h) driving the tractor of the backhoe loader out of the enclosed container;
    (i) repeating step (b);
    (j) removing the two front rollers and the two rear rollers from the tractor of the backhoe loader;

(k) mounting the two front wheels and the two rear wheels to the tractor of the backhoe loader in place of the front and rear rollers; and (l) retracting the stabilizer arms and the loader so that the two front wheels and the two rear wheels of the tractor of the backhoe loader contact the ground.

3. The method of claim 2 in which step (d) comprises providing two front rollers and two rear rollers each including a first plate having a first flange connected to a second plate having a second flange opposed to said first flange, an outer ring mounted to said opposed first and second flanges, and an insert connected to a recess formed in said outer ring in position to contact the ground during steps (f), (g), (h) and (l).

\* \* \* \* \*